US009846829B2

(12) United States Patent
Fastert et al.

(10) Patent No.: US 9,846,829 B2
(45) Date of Patent: *Dec. 19, 2017

(54) CONFORMAL ELECTRONICS INTEGRATED WITH APPAREL

(71) Applicant: MC10, Inc., Lexington, MA (US)

(72) Inventors: Steven Fastert, Chelmsford, MA (US); Kevin J. Dowling, Westford, MA (US); Benjamin Schlatka, Lexington, MA (US); Conor Rafferty, Newton, MA (US)

(73) Assignee: MC10, Inc., Lexington, MA (US)

( * ) Notice: Subject to any disclaimer, the term of this patent is extended or adjusted under 35 U.S.C. 154(b) by 142 days.

This patent is subject to a terminal disclaimer.

(21) Appl. No.: 14/746,659

(22) Filed: Jun. 22, 2015

(65) Prior Publication Data
US 2015/0286913 A1 Oct. 8, 2015

Related U.S. Application Data

(63) Continuation of application No. 13/844,399, filed on Mar. 15, 2013, now Pat. No. 9,082,025.
(Continued)

(51) Int. Cl.
*G06K 19/077* (2006.01)
*G06K 19/02* (2006.01)
(Continued)

(52) U.S. Cl.
CPC ........... *G06K 19/025* (2013.01); *G01K 1/022* (2013.01); *G06K 7/10009* (2013.01);
(Continued)

(58) Field of Classification Search
CPC .. G06K 19/02; G06K 19/027; G06K 19/0716; G06K 19/0717; G06K 19/0723; G06K 19/07749; G06K 19/07779
See application file for complete search history.

(56) References Cited

U.S. PATENT DOCUMENTS 3,716,861 A 2/1973 Root
3,805,427 A 4/1974 Epstein
(Continued)

FOREIGN PATENT DOCUMENTS

CN 101326539 A 12/2008
EP 0585670 A2 3/1994
(Continued)

OTHER PUBLICATIONS

Demura et al., "Immobilization of Glucose Oxidase with *Bombyx mori* Silk Fibroin by Only Stretching Treatment and its Application to Glucose Sensor," Biotechnology and Bioengineering, vol. 33, 598-603 (6 pages) (1989).
(Continued)

*Primary Examiner* — Andrew Bee
(74) *Attorney, Agent, or Firm* — Nixon Peabody LLP

(57) ABSTRACT

A system is provided for integrating conformal electronics devices into apparel. The system includes a flexible substrate onto which a flexible device is disposed. The flexible device can include a stretchable coil that can be used to receive and transmit near field communications. The flexible device also includes an integrated circuit component and a memory unit. In some examples, the device also includes a sensor that is configured to record measurement of the wearer of the apparel and/or the surrounding environment.

26 Claims, 9 Drawing Sheets

Related U.S. Application Data

(60) Provisional application No. 61/711,648, filed on Oct. 9, 2012.

(51) Int. Cl.
  *G06K 7/10* (2006.01)
  *G06K 19/073* (2006.01)
  *G01K 1/02* (2006.01)
  *G06K 19/07* (2006.01)

(52) U.S. Cl.
  CPC .......... *G06K 19/02* (2013.01); *G06K 19/027* (2013.01); *G06K 19/073* (2013.01); *G06K 19/0716* (2013.01); *G06K 19/0717* (2013.01); *G06K 19/0723* (2013.01); *G06K 19/0779* (2013.01); *G06K 19/07749* (2013.01); *G06K 19/07779* (2013.01); *G06K 19/0708* (2013.01)

(56) References Cited

U.S. PATENT DOCUMENTS

| | | |
|---|---|---|
| 4,304,235 A | 12/1981 | Kaufman |
| 4,416,288 A | 11/1983 | Freeman |
| 4,658,153 A | 4/1987 | Brosh |
| 4,747,413 A * | 5/1988 | Bloch .................. A41B 13/00 128/903 |
| 5,306,917 A | 4/1994 | Black |
| 5,326,521 A | 7/1994 | East |
| 5,331,966 A | 7/1994 | Bennett |
| 5,360,987 A | 11/1994 | Shibib |
| 5,454,270 A | 10/1995 | Brown et al. |
| 5,491,651 A | 2/1996 | Janic |
| 5,567,975 A | 10/1996 | Walsh |
| 5,617,870 A | 4/1997 | Hastings et al. |
| 5,811,790 A | 9/1998 | Endo |
| 5,817,008 A | 10/1998 | Rafert et al. |
| 5,907,477 A | 5/1999 | Tuttle et al. |
| 6,063,046 A | 5/2000 | Allum |
| 6,164,551 A * | 12/2000 | Altwasser ............. G01V 15/00 235/383 |
| 6,282,960 B1 | 9/2001 | Samuels et al. |
| 6,343,514 B1 | 2/2002 | Smith |
| 6,387,052 B1 | 5/2002 | Quinn et al. |
| 6,421,016 B1 | 7/2002 | Phillips |
| 6,567,158 B1 | 5/2003 | Falcial |
| 6,641,860 B1 | 11/2003 | Kaiserman |
| 6,784,844 B1 | 8/2004 | Boakes et al. |
| 6,965,160 B2 | 11/2005 | Cobbley |
| 6,987,314 B1 | 1/2006 | Yoshida |
| 7,259,030 B2 | 8/2007 | Daniels et al. |
| 7,265,298 B2 | 9/2007 | Maghribi |
| 7,302,751 B2 | 12/2007 | Hamburgen |
| 7,337,012 B2 | 2/2008 | Maghribi |
| 7,487,587 B2 | 2/2009 | Vanfleteren |
| 7,491,892 B2 | 2/2009 | Wagner |
| 7,521,292 B2 | 4/2009 | Rogers |
| 7,557,367 B2 | 7/2009 | Rogers |
| 7,618,260 B2 | 11/2009 | Daniel et al. |
| 7,622,367 B1 | 11/2009 | Nuzzo |
| 7,727,228 B2 | 6/2010 | Abboud et al. |
| 7,739,791 B2 | 6/2010 | Brandenburg et al. |
| 7,759,167 B2 | 7/2010 | Vanfleteren |
| 7,960,246 B2 | 6/2011 | Flamand |
| 7,982,296 B2 | 7/2011 | Nuzzo |
| 8,097,926 B2 | 1/2012 | De Graff |
| 8,198,621 B2 | 6/2012 | Rogers |
| 8,207,473 B2 | 6/2012 | Axisa |
| 8,217,381 B2 | 7/2012 | Rogers |
| 8,372,726 B2 | 2/2013 | De Graff |
| 8,389,862 B2 | 3/2013 | Arora |
| 8,431,828 B2 | 4/2013 | Vanfleteren |
| 8,440,546 B2 | 5/2013 | Nuzzo |
| 8,536,667 B2 | 9/2013 | De Graff |
| 8,552,299 B2 | 10/2013 | Rogers |
| 8,664,699 B2 | 3/2014 | Nuzzo |
| 8,679,888 B2 | 3/2014 | Rogers |
| 8,729,524 B2 | 5/2014 | Rogers |
| 8,754,396 B2 | 6/2014 | Rogers |
| 8,865,489 B2 | 10/2014 | Rogers |
| 8,886,334 B2 | 11/2014 | Ghaffari |
| 8,905,772 B2 | 12/2014 | Rogers |
| 9,012,784 B2 | 4/2015 | Arora |
| 9,082,025 B2 | 7/2015 | Fastert et al. |
| 9,105,555 B2 | 8/2015 | Rogers |
| 9,105,782 B2 | 8/2015 | Rogers |
| 9,119,533 B2 | 9/2015 | Ghaffari |
| 9,123,614 B2 | 9/2015 | Graff et al. |
| 2001/0012918 A1 | 8/2001 | Swanson |
| 2001/0021867 A1 | 9/2001 | Kordis |
| 2002/0026127 A1 | 2/2002 | Balbierz |
| 2002/0053598 A1 | 5/2002 | Kobayashi |
| 2002/0082515 A1 | 6/2002 | Campbell |
| 2002/0094701 A1 | 7/2002 | Biegelsen et al. |
| 2002/0113739 A1 | 8/2002 | Howard |
| 2002/0128700 A1 | 9/2002 | Cross, Jr. |
| 2002/0151934 A1 | 10/2002 | Levine |
| 2002/0158330 A1 | 10/2002 | Moon et al. |
| 2003/0017848 A1 | 1/2003 | Engstrom |
| 2003/0045025 A1 | 3/2003 | Coyle |
| 2003/0097165 A1 | 5/2003 | Krulevitch |
| 2003/0132893 A1 | 7/2003 | Forster |
| 2003/0162507 A1 | 8/2003 | Vatt |
| 2003/0193399 A1 | 10/2003 | Hum |
| 2003/0214408 A1 | 11/2003 | Grajales |
| 2003/0236455 A1 | 12/2003 | Swanson |
| 2004/0006264 A1 | 1/2004 | Mojarradi |
| 2004/0021559 A1 | 2/2004 | O'Brien |
| 2004/0092806 A1 | 5/2004 | Sagon |
| 2004/0106334 A1 | 6/2004 | Suzuki |
| 2004/0135094 A1 | 7/2004 | Niigaki |
| 2004/0138558 A1 | 7/2004 | Dunki-Jacobs |
| 2004/0149921 A1 | 8/2004 | Smyk |
| 2004/0178466 A1 | 9/2004 | Merrill |
| 2004/0201134 A1 | 10/2004 | Kawai |
| 2004/0203486 A1 | 10/2004 | Shepherd |
| 2004/0221370 A1 | 11/2004 | Hannula et al. |
| 2004/0243204 A1 | 12/2004 | Maghribi |
| 2005/0021103 A1 | 1/2005 | DiLorenzo |
| 2005/0067293 A1 | 3/2005 | Naito |
| 2005/0070778 A1 | 3/2005 | Lackey et al. |
| 2005/0094703 A1 * | 5/2005 | McConnell ......... G01K 13/002 374/101 |
| 2005/0096513 A1 | 5/2005 | Ozguz |
| 2005/0113744 A1 | 5/2005 | Donoghue |
| 2005/0139683 A1 | 6/2005 | Yi |
| 2005/0171524 A1 | 8/2005 | Stern |
| 2005/0203366 A1 | 9/2005 | Donoghue |
| 2006/0003709 A1 | 1/2006 | Wood |
| 2006/0009251 A1 | 1/2006 | Noda |
| 2006/0038182 A1 | 2/2006 | Rogers |
| 2006/0084394 A1 | 4/2006 | Engstrom |
| 2006/0106321 A1 | 5/2006 | Lewinsky |
| 2006/0128346 A1 | 6/2006 | Yasui |
| 2006/0154398 A1 | 7/2006 | Qing |
| 2006/0160560 A1 | 7/2006 | Josenhans |
| 2006/0248946 A1 | 11/2006 | Howell et al. |
| 2006/0257945 A1 | 11/2006 | Masters et al. |
| 2006/0264767 A1 | 11/2006 | Shennib |
| 2006/0286785 A1 | 12/2006 | Rogers |
| 2007/0027514 A1 | 2/2007 | Gerber |
| 2007/0031283 A1 | 2/2007 | Davis et al. |
| 2007/0108389 A1 | 5/2007 | Makela |
| 2007/0113399 A1 | 5/2007 | Kumar et al. |
| 2007/0123756 A1 | 5/2007 | Kitajima et al. |
| 2007/0270672 A1 | 11/2007 | Hayter et al. |
| 2008/0046080 A1 | 2/2008 | Vanden Bulcke |
| 2008/0074383 A1 | 3/2008 | Dean |
| 2008/0096620 A1 | 4/2008 | Lee |
| 2008/0139894 A1 | 6/2008 | Szydlo-Moore et al. |
| 2008/0157235 A1 | 7/2008 | Rogers |
| 2008/0193749 A1 | 8/2008 | Thompson |
| 2008/0204021 A1 | 8/2008 | Leussler et al. |
| 2008/0211087 A1 | 9/2008 | Mueller-Hipper |
| 2008/0211629 A1 | 9/2008 | Evans |

(56) References Cited

U.S. PATENT DOCUMENTS

| | | |
|---|---|---|
| 2008/0214949 A1* | 9/2008 | Stivoric ............. G06F 19/3418 600/549 |
| 2008/0237840 A1 | 10/2008 | Alcoe |
| 2008/0287167 A1 | 11/2008 | Caine |
| 2008/0313552 A1 | 12/2008 | Buehler |
| 2009/0000377 A1 | 1/2009 | Shipps et al. |
| 2009/0001550 A1 | 1/2009 | Li et al. |
| 2009/0015560 A1 | 1/2009 | Robinson |
| 2009/0017884 A1 | 1/2009 | Rotschild |
| 2009/0048556 A1 | 2/2009 | Durand |
| 2009/0088750 A1 | 4/2009 | Hushka |
| 2009/0107704 A1 | 4/2009 | Vanfleteren |
| 2009/0154736 A1 | 6/2009 | Lee |
| 2009/0184254 A1 | 7/2009 | Miura |
| 2009/0215385 A1 | 8/2009 | Waters |
| 2009/0225751 A1 | 9/2009 | Koenck |
| 2009/0261828 A1 | 10/2009 | Nordmeyer-Massner |
| 2009/0273909 A1 | 11/2009 | Shin |
| 2009/0291508 A1 | 11/2009 | Babu et al. |
| 2009/0294803 A1 | 12/2009 | Nuzzo |
| 2009/0322480 A1 | 12/2009 | Benedict et al. |
| 2009/0326409 A1 | 12/2009 | Cohen |
| 2010/0002402 A1 | 1/2010 | Rogers et al. |
| 2010/0059863 A1 | 3/2010 | Rogers |
| 2010/0072577 A1 | 3/2010 | Nuzzo |
| 2010/0073669 A1 | 3/2010 | Colvin |
| 2010/0087782 A1 | 4/2010 | Ghaffari |
| 2010/0090781 A1 | 4/2010 | Yamamoto |
| 2010/0090824 A1 | 4/2010 | Rowell et al. |
| 2010/0116526 A1 | 5/2010 | Arora |
| 2010/0117660 A1 | 5/2010 | Douglas |
| 2010/0178722 A1 | 7/2010 | De Graff |
| 2010/0245011 A1 | 9/2010 | Chatzopoulos et al. |
| 2010/0271191 A1 | 10/2010 | De Graff |
| 2010/0298895 A1 | 11/2010 | Ghaffari et al. |
| 2010/0317132 A1 | 12/2010 | Rogers |
| 2010/0321161 A1 | 12/2010 | Isabell |
| 2010/0327387 A1 | 12/2010 | Kasai |
| 2011/0011179 A1 | 1/2011 | Gustafsson |
| 2011/0034912 A1 | 2/2011 | De Graff et al. |
| 2011/0051384 A1 | 3/2011 | Kriechbaum |
| 2011/0054583 A1 | 3/2011 | Litt |
| 2011/0101789 A1 | 5/2011 | Salter et al. |
| 2011/0121822 A1 | 5/2011 | Parsche |
| 2011/0140897 A1 | 6/2011 | Purks et al. |
| 2011/0175735 A1 | 7/2011 | Forster |
| 2011/0184320 A1 | 7/2011 | Shipps |
| 2011/0215931 A1 | 9/2011 | Callsen |
| 2011/0218756 A1 | 9/2011 | Callsen |
| 2011/0218757 A1 | 9/2011 | Callsen |
| 2011/0220890 A1 | 9/2011 | Nuzzo |
| 2011/0277813 A1 | 11/2011 | Rogers |
| 2011/0306851 A1 | 12/2011 | Wang |
| 2012/0016258 A1 | 1/2012 | Webster et al. |
| 2012/0051005 A1 | 3/2012 | Vanfleteren |
| 2012/0052268 A1 | 3/2012 | Axisa |
| 2012/0065937 A1 | 3/2012 | De Graff |
| 2012/0074546 A1 | 3/2012 | Chong |
| 2012/0087216 A1 | 4/2012 | Keung et al. |
| 2012/0091594 A1 | 4/2012 | Landesberger |
| 2012/0092178 A1 | 4/2012 | Callsen |
| 2012/0092222 A1 | 4/2012 | Kato et al. |
| 2012/0101413 A1 | 4/2012 | Beetel et al. |
| 2012/0101538 A1 | 4/2012 | Ballakur et al. |
| 2012/0108012 A1 | 5/2012 | Yasuda |
| 2012/0157804 A1 | 6/2012 | Rogers |
| 2012/0172697 A1 | 7/2012 | Urman |
| 2012/0226130 A1 | 9/2012 | De Graff |
| 2012/0234921 A1* | 9/2012 | Tiedmann ............. G06K 19/02 235/488 |
| 2012/0244848 A1 | 9/2012 | Ghaffari |
| 2012/0256308 A1 | 10/2012 | Helin |
| 2012/0273577 A1 | 11/2012 | Kim |
| 2012/0316455 A1 | 12/2012 | Rahman et al. |
| 2012/0327608 A1 | 12/2012 | Rogers |
| 2013/0041235 A1 | 2/2013 | Rogers et al. |
| 2013/0099358 A1 | 4/2013 | Elolampi |
| 2013/0100618 A1 | 4/2013 | Rogers |
| 2013/0118255 A1 | 5/2013 | Callsen |
| 2013/0150693 A1 | 6/2013 | D'angelo |
| 2013/0185003 A1 | 7/2013 | Carbeck |
| 2013/0192356 A1 | 8/2013 | De Graff |
| 2013/0200268 A1 | 8/2013 | Rafferty |
| 2013/0211761 A1 | 8/2013 | Brandsma et al. |
| 2013/0214300 A1 | 8/2013 | Lerman et al. |
| 2013/0215467 A1 | 8/2013 | Fein et al. |
| 2013/0225965 A1 | 8/2013 | Ghaffari |
| 2013/0237150 A1 | 9/2013 | Royston |
| 2013/0245388 A1 | 9/2013 | Rafferty et al. |
| 2013/0274562 A1 | 10/2013 | Ghaffari |
| 2013/0313713 A1 | 11/2013 | Arora |
| 2013/0316442 A1 | 11/2013 | Meurville et al. |
| 2013/0316487 A1 | 11/2013 | De Graff |
| 2013/0320503 A1 | 12/2013 | Nuzzo |
| 2013/0321373 A1 | 12/2013 | Yoshizumi |
| 2014/0001058 A1 | 1/2014 | Ghaffari et al. |
| 2014/0012160 A1 | 1/2014 | Ghaffari |
| 2014/0012242 A1 | 1/2014 | Lee |
| 2014/0022746 A1 | 1/2014 | Hsu |
| 2014/0039290 A1 | 2/2014 | De Graff |
| 2014/0097944 A1 | 4/2014 | Fastert |
| 2014/0110859 A1 | 4/2014 | Rafferty |
| 2014/0140020 A1 | 5/2014 | Rogers |
| 2014/0188426 A1 | 7/2014 | Fastert |
| 2014/0191236 A1 | 7/2014 | Nuzzo |
| 2014/0216524 A1 | 8/2014 | Rogers |
| 2014/0240932 A1 | 8/2014 | Hsu |
| 2014/0249520 A1 | 9/2014 | Ghaffari |
| 2014/0303452 A1 | 10/2014 | Ghaffari |
| 2014/0340857 A1 | 11/2014 | Hsu |
| 2014/0374872 A1 | 12/2014 | Rogers |
| 2014/0375465 A1 | 12/2014 | Fenuccio |
| 2015/0001462 A1 | 1/2015 | Rogers |
| 2015/0019135 A1 | 1/2015 | Kacyvenski |
| 2015/0035680 A1 | 2/2015 | Li |
| 2015/0069617 A1 | 3/2015 | Arora et al. |
| 2015/0099976 A1 | 4/2015 | Ghaffari et al. |
| 2015/0100135 A1 | 4/2015 | Ives |
| 2015/0194817 A1 | 7/2015 | Lee et al. |
| 2015/0237711 A1 | 8/2015 | Rogers et al. |
| 2015/0241288 A1 | 8/2015 | Keen et al. |
| 2015/0260713 A1 | 9/2015 | Ghaffari et al. |

FOREIGN PATENT DOCUMENTS

| | | |
|---|---|---|
| EP | 2259062 A2 | 12/2010 |
| JP | 05-087511 A | 4/1993 |
| JP | 11-268461 | 10/1999 |
| JP | 2002-74298 | 3/2002 |
| JP | 2005-241124 | 9/2005 |
| JP | 2006-24087 | 1/2006 |
| JP | 2006-236332 A | 9/2006 |
| JP | 2007-183919 | 7/2007 |
| JP | 2008-532596 | 8/2008 |
| JP | 2009-170173 A | 7/2009 |
| WO | WO 2005/122285 A2 | 12/2005 |
| WO | WO 2007/003019 A2 | 1/2007 |
| WO | WO 2007/136726 A2 | 11/2007 |
| WO | WO 2008/030960 A2 | 3/2008 |
| WO | WO 2009/111641 A1 | 9/2009 |
| WO | WO 2009/114689 A1 | 9/2009 |
| WO | WO 2010/036807 A1 | 4/2010 |
| WO | WO 2010/042653 A1 | 4/2010 |
| WO | WO 2010/042957 A2 | 4/2010 |
| WO | WO 2010/046883 A1 | 4/2010 |
| WO | WO 2010/056857 A2 | 5/2010 |
| WO | WO 2010/081137 A2 | 7/2010 |
| WO | WO 2010/082993 A2 | 7/2010 |
| WO | WO 2010/102310 A2 | 9/2010 |
| WO | WO 2010/132552 A1 | 11/2010 |
| WO | WO 2011/003181 A1 | 1/2011 |
| WO | WO 2011/041727 A1 | 4/2011 |

(56) References Cited

FOREIGN PATENT DOCUMENTS

| WO | WO 2011/084450 A1 | 7/2011 |
|---|---|---|
| WO | WO 2011/084709 A2 | 7/2011 |
| WO | WO 2011/127331 A2 | 10/2011 |
| WO | WO 2012/125494 A2 | 9/2012 |
| WO | WO 2012/166686 A2 | 12/2012 |
| WO | WO 2013/010171 A1 | 1/2013 |
| WO | WO 2013/022853 A1 | 2/2013 |
| WO | WO 2013/033724 A1 | 3/2013 |
| WO | WO 2013/034987 A3 | 3/2013 |
| WO | WO 2013/049716 A1 | 4/2013 |
| WO | WO 2013/052919 A2 | 4/2013 |
| WO | WO 2013/170032 A2 | 11/2013 |
| WO | WO 2014/007871 A1 | 1/2014 |
| WO | WO 2014/058473 A1 | 4/2014 |
| WO | WO 2014/059032 A1 | 4/2014 |
| WO | WO 2014/106041 A1 | 7/2014 |
| WO | WO 2014/110176 A1 | 7/2014 |
| WO | WO 2014/130928 A2 | 8/2014 |
| WO | WO 2014/130931 A1 | 8/2014 |
| WO | WO 2014/186467 A2 | 11/2014 |
| WO | WO 2014/197443 A1 | 12/2014 |
| WO | WO 2014/205434 A2 | 12/2014 |
| WO | WO 2015/021039 A1 | 2/2015 |
| WO | WO 2015/054312 A1 | 4/2015 |
| WO | WO 2015/077559 A1 | 5/2015 |
| WO | WO 2015/080991 A1 | 6/2015 |
| WO | WO 2015/102951 A2 | 7/2015 |
| WO | WO 2015/103483 A1 | 7/2015 |
| WO | WO 2015/103580 A2 | 7/2015 |
| WO | WO 2015/127458 A1 | 8/2015 |
| WO | WO 2015/134588 A1 | 9/2015 |

OTHER PUBLICATIONS

Halsted, "Ligature and Suture Material," Journal of the American Medical Association, vol. LX, No. 15, 1119-1126, (8 pages) (Apr. 12, 1913).

Kim et al., "Complementary Metal Oxide Silicon Integrated Circuits Incorporating Monolithically Integrated Stretchable Wavy Interconnects," Applied Physics Letters, vol. 93, 044102-044102.3 (3 pages) (Jul. 31, 2008).

Kim et al., "Dissolvable Films of Silk Fibroin for Ultrathin Conformal Bio-Integrated Electronics," Nature, 1-8 (8 pages) (Apr. 18, 2010).

Kim et al., "Materials and Noncoplanar Mesh Designs for Integrated Circuits with Linear Elastic Responses to Extreme Mechanical Deformations," PNAS, vol. 105, No. 48, 18675-18680 (6 pages) (Dec. 2, 2008).

Kim et al., "Stretchable and Foldable Silicon Integrated Circuits," Science, vol. 320, 507-511 (5 pages) (Apr. 25, 2008).

Ko et al., "A Hemispherical Electronic Eye Camera Based on Compressible Silicon Optoelectronics," Nature, vol. 454, 748-753 (6 pages) (Aug. 7, 2008).

Lawrence et al., "Bioactive Silk Protein Biomaterial Systems for Optical Devices," Biomacromolecules, vol. 9, 1214-1220 (7 pages) (Nov. 4, 2008).

Meitl et al., "Transfer Printing by Kinetic Control of Adhesion to an Elastomeric Stamp," Nature, vol. 5, 33-38 (6 pages) (Jan. 2006).

Omenetto et al., "A New Route for Silk," Nature Photonics, vol. 2, 641-643 (3 pages) (Nov. 2008).

Omnetto et al., "New Opportunities for an Ancient Material," Science, vol. 329, 528-531 (5 pages) (Jul. 30, 2010).

Tsukada et al., "Structural Changes of Silk Fibroin Membranes Induced by Immersion in Methanol Aqueous Solutions," Journal of Polymer Science, vol. 32, 961-968 (8 pages) (1994).

Wang et al., "Controlled Release From Multilayer Silk Biomaterial Coatings to Modulate Vascular Cell Responses" Biomaterials, 29, 894-903 (10 pages) (Nov. 28, 2008).

* cited by examiner

CONFORMAL ELECTRONICS INTEGRATED WITH APPAREL

CROSS-REFERENCE TO RELATED PATENT APPLICATIONS

This application is a continuation of U.S. patent application Ser. No. 13/844,399, filed Mar. 15, 2013, and titled "Conformal Electronics Integrated With Apparel," now allowed, which claims the benefit of U.S. Provisional Application No. 61/711,648, filed Oct. 9, 2012, and titled "Conformal Electronics Integrated With Apparel," all of which are hereby incorporated by reference in their entirety.

BACKGROUND

Modern athletic and other apparel is often highly tailored to its specific function. While highly advanced, modern athletic apparel lacks the ability to monitor the performance and physiological conditions of the wearer, there are many situations where athletes, warfighters, and civilians could benefit from instant information about their apparel and/or physiological state.

SUMMARY

Various examples described herein are directed generally to systems, methods and apparatus related to conformal electronic technology integrated with sportswear apparel and other similar products. Example systems, methods and apparatus described herein are also directed to the integration of conformal electronics into sports apparel.

According to one aspect of the disclosure, a tagging device incorporated into apparel can include a flexible substrate to which a flexible device is disposed. The flexible device can include a stretchable coil formed from a conductive material and comprising at least one corrugated portion. The flexible device can also include an integrated circuit component disposed proximate to and in electrical communication with the stretchable coil. The circuit components of the flexible device can include at least one memory that is read and write-enabled. The flexible device can be encapsulated and configured for remote data read- and write-operations to the at least one memory to store identifying information.

A tagging device according to the principle described herein can include at least one of an erasable programmable read only memory (EPROM) and an electrically erasable programmable read only memory (EEPROM).

In an example, the flexible substrate and flexible encapsulant can be configured such that the apparatus remains functional after exposure to water. The flexible substrate and flexible encapsulant can also be configured such that the apparatus remains functional after exposure to at least thirty wash cycles.

In an example, the device can be configured for remote data read and write operations to the at least one memory. The read and write to the at least one memory can be based on a radio-frequency signal detected by the stretchable coil or based on a radio-frequency signal transmitted using the stretchable coil.

In an example, the at least one corrugated portion of the conductive coil can include a zig-zag structure, a serpentine structure, a grooved structure, or a rippled structure, and the at least one coil structure can be polygonal-shaped, circular-shaped, square-shaped, or rectangular-shaped.

In an example, the flexible substrate comprises at least one of a polymer, an elastomer, a fabric, a thermo-polyurethane, a thermo-polyester, rubber material or paper. In an example, the stretchable coil includes a hollow central region, and wherein the flexible substrate and flexible encapsulant are configured such that the apparatus comprises a hollow core that coincides with the hollow central region of the stretchable coil.

In an example, the identifying information includes at least one of a unique identifier, user name, a user identification, a player designation, a jersey number, a military identification, laundry instructions, a location.

According to another aspect of the disclosure, an apparatus for monitoring a temperature can include a flexible substrate to which a flexible device is disposed. The flexible device can include a stretchable coil formed from a conductive material and comprising at least one corrugated portion. The flexible device can also include an integrated circuit component disposed proximate to and in electrical communication with the stretchable coil. The integrated circuit component of the flexible device can include at least one memory that is read and write-enabled. The flexible device can include a flexible encapsulant. The apparatus can also include a temperature sensor in communication with the flexible device, to perform at least one temperature measurement. The data indicative of the at least one temperature measurement can be stored to the at least one memory.

In an example, the apparatus can further include an energy supply in electrical communication with the integrated circuit. The energy supply can be a battery or a solar cell or other energy harvesting device. The apparatus can also further include a microcapacitor in electrical communication with the energy supply and the integrated circuit.

In an example, the flexible device is configured to perform the at least one temperature measurement at regular time intervals and store the data to the at least one memory at the regular time intervals. In an example, the integrated circuit component comprises at least one of an erasable programmable read only memory (EPROM) and an electrically erasable programmable read only memory (EEPROM).

In an example, the flexible substrate and flexible encapsulant are configured such that the apparatus remains functional after exposure to water and can remain functional after exposure to at least thirty wash cycles.

In an example, the apparatus can be configured for remote data read and write operations to the at least one memory. The apparatus can be configured to perform read or write operations to the at least one memory based on a radio-frequency signal detected by the stretchable coil or based on a radio-frequency signal transmitted using the stretchable coil.

In an example, the at least one corrugated portion of the conductive coil can include a zig-zag structure, a serpentine structure, a grooved structure, or a rippled structure, and the at least one coil structure can be polygonal-shaped, circular-shaped, square-shaped, or rectangular-shaped.

In an example, the flexible substrate comprises at least one of a polymer, an elastomer, a fabric, a thermo-polyurethane, a thermo-polyester, or paper. In an example, the stretchable coil includes a hollow central region, and wherein the flexible substrate and flexible encapsulant are configured such that the apparatus comprises a hollow core that coincides with the hollow central region of the stretchable coil.

In an example, the temperature sensor is disposed on the flexible substrate, and wherein the flexible encapsulant encapsulates the temperature sensor. In an example, the temperature sensor is external to the flexible device, and the temperature sensor is configured to transmit data indicative of the at least one temperature measurement to the flexible device using a wireless transmission protocol. In another example, the temperature sensor is external to the flexible device, and wherein the temperature sensor is coupled to the flexible device by at least one flexible interconnect.

In another example, the apparatus further includes a display coupled to the flexible device to display information based on the at least one temperature measurement. The display can display at least one of a numerical value indicating the at least one temperature measurement, a graphic symbol representing the at least one temperature measurement, a graphic plot based on the at least one temperature measurement, or a range indicator that indicates the result of a comparison of the at least one temperature measurement to a predetermined threshold value. In an example, the display can display a recommendation of clothing selection based on the at least one temperature measurement. The display can be an electrophoretic ink display, a liquid crystal display, or a flat-panel display.

According to another aspect of the disclosure, an apparatus for monitoring an amount of exposure to ultraviolet radiation includes a flexible substrate and a flexible device disposed on the flexible substrate. The flexible device can include a stretchable coil formed from a conductive material and can include at least one corrugated portion. The flexible device can also include an integrated circuit component disposed proximate to and in electrical communication with the stretchable coil. The integrated circuit component can include at least one memory that is read and write-enabled. The flexible device can be encapsulated with an encapsulant. The apparatus can further include an ultraviolet radiation sensor in communication with the flexible device, to perform at least one ultraviolet radiation measurement. The apparatus can be configured for remote data read- and write-operations to the at least one memory to store data indicative of the at least one ultraviolet radiation measurement or an indication of an amount of the exposure of the ultraviolet radiation sensor to the ultraviolet radiation.

In an example, the apparatus can further include an energy supply in electrical communication with the integrated circuit. The energy supply can be a battery or a solar cell.

In another example, the apparatus can further include a microcapacitor in electrical communication with the energy supply and the integrated circuit.

In an example, the apparatus can be configured to perform the at least ultraviolet radiation measurement at regular time intervals, and wherein the data indicative of the at least one ultraviolet radiation measurement is stored to the read and write-enabled memory at the regular time intervals. The integrated circuit component can include at least one of an erasable programmable read only memory (EPROM) and an electrically erasable programmable read only memory (EEPROM).

In an example, the flexible substrate and flexible encapsulant can be configured to remain functional after exposure to water, and can remain functional after exposure to at least thirty wash cycles.

In an example, the apparatus can be configured for remote data read and write operations to the at least one memory. The apparatus can be further configured to perform read or write operations to the at least one memory based on a radio-frequency signal detected by the stretchable coil or based on a radio-frequency signal transmitted using the stretchable coil.

In an example, the at least one corrugated portion of the coil can include a zig-zag structure, a serpentine structure, a grooved structure, or a rippled structure. The coil structure can be polygonal-shaped, circular-shaped, square-shaped, or rectangular-shaped.

In an example, the ultraviolet radiation sensor can be disposed on the flexible substrate, and can be encapsulated with the encapsulant. In an example, the ultraviolet radiation sensor can be external to the flexible device, and the ultraviolet radiation sensor can be configured to transmit data indicative of the at least one ultraviolet radiation measurement to the flexible device using a wireless transmission protocol.

In another example, the ultraviolet radiation sensor can be external to the flexible device, and can be coupled to the flexible device by at least one flexible interconnect. The apparatus can further include a display coupled to the flexible device to display information based on the at least one ultraviolet radiation measurement.

In an example, the display can display at least one of a numerical value indicating the at least one ultraviolet radiation measurement, a graphic symbol representing the at least one ultraviolet radiation measurement, a graphic plot based on the at least one ultraviolet radiation measurement, or a range indicator that indicates the result of a comparison of the at least one ultraviolet radiation measurement to a predetermined threshold value. In another example, the display can display a recommendation of clothing selection based on the at least one ultraviolet radiation measurement. The display can include an electrophoretic ink display, a liquid crystal display, or a flat-panel display.

The following publications, patents, and patent applications are hereby incorporated herein by reference in their entirety:

Kim et al., "Stretchable and Foldable Silicon Integrated Circuits," Science Express, Mar. 27, 2008, 10.1126/science.1154367;

Ko et al., "A Hemispherical Electronic Eye Camera Based on Compressible Silicon Optoelectronics," Nature, Aug. 7, 2008, vol. 454, pp. 748-753;

Kim et al., "Complementary Metal Oxide Silicon Integrated Circuits Incorporating Monolithically Integrated Stretchable Wavy Interconnects," Applied Physics Letters, Jul. 31, 2008, vol. 93, 044102;

Kim et al., "Materials and Noncoplanar Mesh Designs for Integrated Circuits with Linear Elastic Responses to Extreme Mechanical Deformations," PNAS, Dec. 2, 2008, vol. 105, no. 48, pp. 18675-18680;

Meitl et al., "Transfer Printing by Kinetic Control of Adhesion to an Elastomeric Stamp," Nature Materials, January, 2006, vol. 5, pp. 33-38;

U.S. Patent Application publication no. 2010 0002402-A1, published Jan. 7, 2010, filed Mar. 5, 2009, and entitled "STRETCHABLE AND FOLDABLE ELECTRONIC DEVICES;"

U.S. Patent Application publication no. 2010 0087782-A1, published Apr. 8, 2010, filed Oct. 7, 2009, and entitled "CATHETER BALLOON HAVING STRETCHABLE INTEGRATED CIRCUITRY AND SENSOR ARRAY;"

U.S. Patent Application publication no. 2010 0116526-A1, published May 13, 2010, filed Nov. 12, 2009, and entitled "EXTREMELY STRETCHABLE ELECTRONICS;"

U.S. Patent Application publication no. 2010 0178722-A1, published Jul. 15, 2010, filed Jan. 12, 2010, and entitled "METHODS AND APPLICATIONS OF NON-PLANAR IMAGING ARRAYS;" and U.S. Patent Application publication no. 2010 027119-A1, published Oct. 28, 2010, filed Nov. 24, 2009, and entitled "SYSTEMS, DEVICES, AND METHODS UTILIZING STRETCHABLE ELECTRONICS TO MEASURE TIRE OR ROAD SURFACE CONDITIONS."

Kim, D. H. et al. (2010). Dissolvable films of silk fibroin for ultrathin conformal bio-integrated electronics. *Nature Materials*, 9, 511-517.

Omenetto, F. G. and D. L. Kaplan. (2008). A new route for silk. *Nature Photonics*, 2, 641-643.

Omenetto, F. G., Kaplan, D. L. (2010). New opportunities for an ancient material. *Science*, 329, 528-531.

Halsed, W. S. (1913). Ligature and suture material. *Journal of the American Medical Association*, 60, 1119-1126.

Masuhiro, T., Yoko, G., Masaobu, N., et al. (1994). Structural changes of silk fibroin membranes induced by immersion in methanol aqueous solutions. *Journal of Polymer Science*, 5, 961-968.

Lawrence, B. D., Cronin-Golomb, M., Georgakoudi, I., et al. (2008). Bioactive silk protein biomaterial systems for optical devices. *Biomacromolecules*, 9, 1214-1220.

Demura, M., Asakura, T. (1989). Immobilization of glucose oxidase with Bombyx mori silk fibroin by only stretching treatment and its application to glucose sensor. *Biotechnololgy and Bioengineering*, 33, 598-603.

Wang, X., Zhang, X., Castellot, J. et al. (2008). Controlled release from multilayer silk biomaterial coatings to modulate vascular cell responses. *Biomaterials*, 29, 894-903.

U.S. patent application Ser. No. 12/723,475 entitled "SYSTEMS, METHODS, AND DEVICES FOR SENSING AND TREATMENT HAVING STRETCHABLE INTEGRATED CIRCUITRY," filed Mar. 12, 2010.

U.S. patent application Ser. No. 12/686,076 entitled "Methods and Applications of Non-Planar Imaging Arrays," filed Jan. 12, 2010.

U.S. patent application Ser. No. 12/636,071 entitled "Systems, Methods, and Devices Using Stretchable or Flexible Electronics for Medical Applications," filed Dec. 11, 2009.

U.S. Patent Application publication no 2012-0065937-A1, published Mar. 15, 2012, and entitled "METHODS AND APPARATUS FOR MEASURING TECHNICAL PARAMETERS OF EQUIPMENT, TOOLS AND COMPONENTS VIA CONFORMAL ELECTRONICS."

U.S. patent application Ser. No. 12/616,922 entitled "Extremely Stretchable Electronics," filed Nov. 12, 2009.

U.S. patent application Ser. No. 12/575,008 entitled "Catheter Balloon Having Stretchable Integrated Circuitry and Sensor Array," filed on Oct. 7, 2009.

U.S. patent application Ser. No. 13/336,518 entitled "Systems, Methods, and Devices Having Stretchable Integrated Circuitry for Sensing and Delivering Therapy," filed Dec. 23, 2011.

It should be appreciated that all combinations of the foregoing concepts and additional concepts discussed in greater detail below (provided such concepts are not mutually inconsistent) are contemplated as being part of the inventive subject matter disclosed herein. It also should be appreciated that terminology explicitly employed herein that also may appear in any disclosure incorporated by reference should be accorded a meaning most consistent with the particular concepts disclosed herein.

BRIEF DESCRIPTION OF THE DRAWINGS AND APPENDICES

The skilled artisan will understand that the figures, described herein, are for illustration purposes only. It is to be understood that in some instances various aspects of the described implementations may be shown exaggerated or enlarged to facilitate an understanding of the described implementations. In the drawings, like reference characters generally refer to like features, functionally similar and/or structurally similar elements throughout the various drawings. The drawings are not necessarily to scale, emphasis instead being placed upon illustrating the principles of the teachings. The drawings are not intended to limit the scope of the present teachings in any way. The system and method may be better understood from the following illustrative description with reference to the following drawings in which:

DETAILED DESCRIPTION

Figure 1:
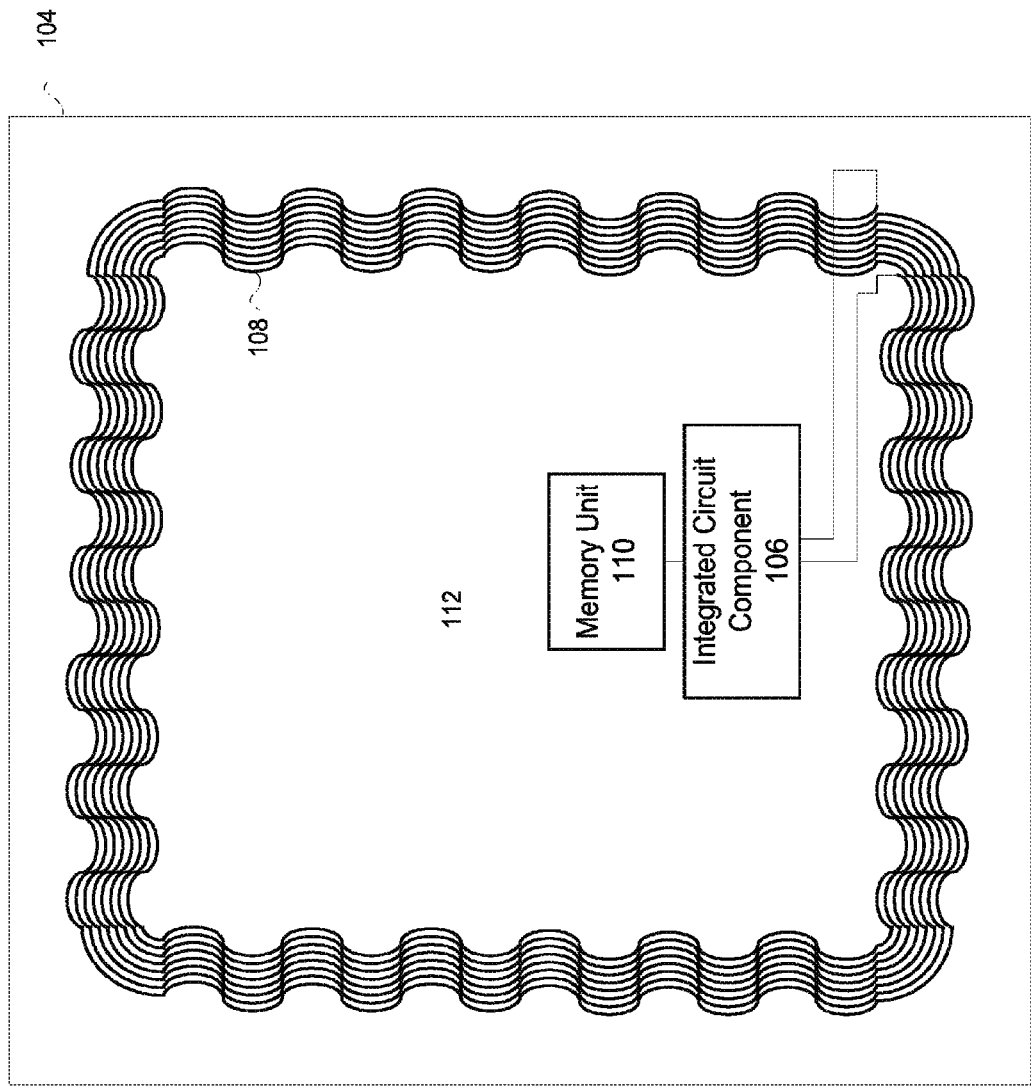
FIG. 1 shows an example conformal electronics device for tagging apparel, according to the principles herein.

It should be appreciated that all combinations of the concepts discussed in greater detail below (provided such concepts are not mutually inconsistent) are contemplated as being part of the inventive subject matter disclosed herein. It also should be appreciated that terminology explicitly employed herein that also may appear in any disclosure incorporated by reference should be accorded a meaning most consistent with the particular concepts disclosed herein.

Following below are more detailed descriptions of various concepts related to, and embodiments of disposing conformal electronics in apparel. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

As used herein, the term "includes" means includes but is not limited to, the term "including" means including but not limited to. The term "based on" means based at least in part on. As used herein, the term "disposed on" or "disposed above" is defined to encompass "at least partially embedded in."

The disclosure relates to methods and conformal electronics devices that can be integrated with apparel and other similar products. Any of the devices and disclosed herein can be disposed or integrated into apparel or fabric or be coupled to apparel. The apparel can include, but is not limited to, performance apparel, such as apparel engineered to keep athletes cool, dry and light throughout the course of a game, a practice session or a workout; apparel that is configured according to a seasonal temperature behavior, such as apparel that is configured for warmer temperatures, apparel configured for cooler temperatures, and apparel configured for temperatures between these extremes; protective apparel such as helmets and sports pads; and everyday apparel such as outerwear, underwear, hats, shirts, and gloves. In another example, the devices disclosed herein can be incorporated as technology that displays that identifies the wearer (or owner) of a piece of apparel.

In one example, the incorporation of conformal electronics into apparel according to the principles described herein can be beneficial to athletes, those involved in tactical exercises (such as but not limited to the military), and any gender or age of wearer (men/boys/women/girls).

In one example, the conformal electronics are incorporated into the garment. For example, the conformal electronics may be woven into or a part of the apparel. In another example, the conformal electronics can be coupled to the apparel. In this example, the conformal electronic device may be sewn into the lining of a garment or the garment may include a pocket or pouch specifically deigned to accept the conformal electronics device. In another example, the conformal electronics can have an adhesive backing that allows the conformal electronics to be coupled to the apparel, and in another example the conformal electronics device can be incorporated into a logo or other component of the apparel.

In an example, a component of the conformal electronics device described herein can be formed from a commercial-off-the-shelf (COTS) component that is thinned to a desired thickness for increased conformability.

In various examples, the conformal electronics device described herein can be encapsulated in a polymer or polymeric material. Non-limiting examples of applicable polymers or polymeric materials include, but are not limited to, a polyimide, a polyethylene terephthalate (PET), or a polyeurethane. Other non-limiting examples of applicable polymers or polymeric materials include plastics, elastomers, thermoplastic elastomers, elastoplastics, thermostats, thermoplastics, acrylates, acetal polymers, biodegradable polymers, cellulosic polymers, fluoropolymers, nylons, polyacrylonitrile polymers, polyamide-imide polymers, polyarylates, polybenzimidazole, polybutylene, polycarbonate, polyesters, polyetherimide, polyethylene, polyethylene copolymers and modified polyethylenes, polyketones, poly (methyl methacrylate, polymethylpentene, polyphenylene oxides and polyphenylene sulfides, polyphthalamide, polypropylene, polyurethanes, styrenic resins, sulphone based resins, vinyl-based resins, or any combinations of these materials. In an example, a polymer or polymeric material herein can be a DYMAX® polymer (Dymax Corporation, Torrington, Conn.).or other UV curable polymer. Additionally, the flexible substrate can include an elastomer, a fabric, a thermo-polyurethane, a thermo-polyester, or paper. The polymer of the encapsulant may be the same as the polymer of the substrate or can be different from the polymer of the substrate.

In various examples, the conformal electronics device described herein can include one or more passive electronic components and/or one or more active electronic components. Non-limiting examples of components that can be included in the conformal electronics device according to the principles described herein include a transistor, an amplifier, a photodetector, a photodiode array, a display, a light-emitting device, a photovoltaic device, a sensor, a LED, a semiconductor laser array, an optical imaging system, a large-area electronic device, a logic gate array, a microprocessor, an integrated circuit, an electronic device, an optical device, an opto-electronic device, a mechanical device, a microelectromechanical device, a nanoelectromechanical device, a microfluidic device, a thermal device, and other device structures.

In a non-limiting example, the conformal electronics device disposed close to the neutral mechanical plane of the overall apparel and/or electronics pouch structure. Through choice of suitable encapsulant and substrate layers above and/or below the conformal electronics device, the strain on the functional layer of the conformal electronics device can be minimized. A functional layer herein can include the conformal electronics device. In an example, the polymer of the substrate can be formed of a material having a Young's modulus of about 3 GPa to about 8 GPa. Non-limiting examples of such polymers include a polyimide, such as but not limited to KAPTON® (available from DuPont, Del.).

In an example, a conformal electronics device can be positioned such that the functional layer of the conformal electronics device lies at a neutral mechanical plane (NMP) or neutral mechanical surface (NMS) of the system or apparatus. The NMP or NMS lies at the position through the thickness of the device layers for the system or apparatus where any applied strains are minimized or substantially zero. In an example, the functional layer of a system or apparatus according to the principles described herein includes a plurality of conformal electronics devices.

The location of the NMP or NMS can be changed relative to the layer structure of the system or apparatus through introduction of materials that aid in strain isolation in various layers of the system or apparatus. In various examples, polymer materials described herein can be introduced to serve as strain isolation materials. For example, the encapsulating material described hereinabove also can be used to position the NMP or NMS, e.g., by varying the encapsulating material type and/or layer thickness. For example, the thickness of encapsulating material disposed over the functional layers described herein may be modified (i.e., decreased or increased) to depress the functional layer relative to the overall system or apparatus thickness, which can vary the position of the NMP or NMS relative to the functional layer. In another example, the type of encapsulating, including any differences in the elastic (Young's) modulus of the encapsulating material.

In another example, at least a partial intermediate layer of a material capable of providing strain isolation can be disposed between the functional layer and the flexible substrate to position the NMP or NMS relative to the functional layer. In an example, the intermediate layer can be formed from any of the polymer materials described herein, aerogel materials or any other material with applicable elastic mechanical properties.

Based on the principles described herein, the NMP or NMS can be positioned proximate to, coincident with or adjacent to a layer of the system or apparatus that includes the strain-sensitive component, such as but not limited to the functional layer. The layer can be considered "strain-sensitive" if it is prone to fractures or its performance can be otherwise impaired in response to a level of applied strain. In an example where the NMP or NMS is proximate to a strain-sensitive component rather than coincident with it, the position of the NMP or NMS may still provide a mechanical benefit to the strain-sensitive component, such as substantially lowering the strain that would otherwise be exerted on the strain-sensitive component in the absence of strain isolation layers. In various examples, the NMS or NMP layer is considered proximate to the strain-sensitive component that provides at least 10%, 20%, 50% or 75% reduction in strain in the strain-sensitive component for a given applied strain, e.g., where the conformal electronics device is deformed.

In various examples, the encapsulating material and/or the intermediate layer material may be disposed at positions relative to the conformal electronics device that are coincident with the strain-sensitive component. For example, portions of the encapsulating material and/or the intermediate layer material may be interspersed with portions of the strain-sensitive component, through the conformal electronics device, including at positions within the functional layer.

In some implementations, the devices disclosed herein can be encapsulated in the flexible substrate. In one example, the encapsulation of a device with one of the polymers described herein, or similar polymers, protects the device from, but not limited to, exposure to water, sweat, snow, and other environmental factors. In some examples, the encapsulation makes the devices described herein water resistant and/or water-proof. In certain implementations, the encapsulation of the device can ensure the device remains functional if washed with a garment. The encapsulated device can remain functional for thirty or more wash cycles.

According to the principles disclosed herein, a device for tagging can include a flexible substrate and a flexible device that is disposed on the flexible substrate. The flexible device can include a stretchable coil formed from a conductive material and can include at least one corrugated portion. The flexible device can also include an integrated circuit that includes a memory unit with read/write capabilities. At least a portion of the apparatus can be encapsulated with a flexible polymer.

Any of the connections between the components of the devices disclosed herein can include stretchable interconnects. In some examples, the conductive coil includes corrugated portions that allow the conductive coil to flex and stretch. The corrugated portions of the conductive coil and the stretchable interconnects can include zig-zag structures, a serpentine structures, a grooved structures, or a rippled structures that can flex with the flexible substrate without incurring damage.

In various example, the devices disclosed herein include a memory unit with read/write capabilities. The memory unit can comprise erasable programmable read only memory (EPROM) and an electrically erasable programmable read only memory (EEPROM). In some examples, the memory can be included in a RFID tag. In some implementations, the memory of the RFID tag has read and write capabilities, and in some implementations the RFID card is read only. In another example, the memory unit can comprise removable media and/or be coupled to removable media such that the memory unit can be temperately removed. In some example implementations, the memory unit can include flash memory, solid state drives, removable memory cards, or any combination thereof.

In some examples, the memory unit of the device can be remotely accessed, such that data can be read and/or written to the memory unit. In some implementations, the device includes an access port that allows for read/write access to the memory unit. In some implementations, the device includes a signal transmitter and/or receiver that allows data to be wirelessly read and/or written to the memory unit. In some implementations, the wireless communication can be through near-field communication (NFC) protocols, such as, but not limited to, radio-frequency identification (RFID). The radio frequency can occur over short ranges (e.g. 0-2 m), medium ranges (e.g. 2-100 m) and long ranges (e.g. over 100 m). In some examples, the radio-frequency communication can occur over industrial, scientific and medial (ISM) radio bands; the Ultra wideband (UWB), and/or unregulated portions of the radio spectrum. In some examples, the wireless communication may be through long range wireless communication protocols, such as, but not limited to 802.11a/b/c/g/n/ (also referred to as WiFi).

In some examples, the data stored in the memory unit can include data from sensors, such as the below described temperature and ultraviolet sensors. In some examples, the sensors can transmit data to the conformal electronics device wirelessly. In other examples, the data stored in the memory unit can include identification data. The identification data can include the contact information of a wearer/owner, jersey number and name, player designation, military information data (such as that type of data that can be found on a "dog tag"), non-personal identification data (such as a unique random number that can later be associated with a wearer/owner), apparel information (such apparel size), laundry instructions and/or a unique number associated with each device.

In some examples, the data on the memory unit is accessed, either wired or wirelessly, by a NFC-enabled hand-held device. Example devices can include a smartphone, a tablet, a slate, an e-reader, or other similar handheld device. In some implementations, read access to the memory unit is open to anyone, and the write access to the memory unit is secured to the owner of the apparel. For example, a smartphone may execute a program that allows the owner of a dry clean only shirt to program the owners contact information and cleaning preferences into the memory unit of the device. When the dry cleaner receives the shit for cleaning the dry cleaning can access the data on the tag to determine the owner's preferences but they are not given permission to change or modify the data on the memory unit.

In an example, the device can include a stretchable coil that includes a conductive material. The stretchable coil can include at least one corrugated portion. In some implementations, the stretchable coil can form an antenna, such as a NFC antenna. The coil can include serpentine, zig-zag, grooved, and or rippled portions to allow increased stretchability and resistance to deformation, torsion, or other mechanical forces. In some examples, power can be delivered to the device via RF induction of the stretchable coil. In some implementations, this allows the device to be powered without a local power source, such as a battery, solar cell or other energy harvesting device such as a piezoelectric energy circuit.

According to the principles described herein, the conformal device can include a temperature sensor. In some implementations, a temperature measurement is taken with the temperature sensor and stored in the memory unit of the conformal electronics device. In one example, the temperature measurement can be made on request, such as when the wearer triggers the device to make a measurement. In another example, the temperature measurement can be made at a regular interval, such as, but not limited to, every second, minute, hour, or day.

Also according the principles described herein, the conformal electronics device can include an ultraviolet radiation sensor. In some examples, the ultraviolet radiation sensor can be configured to detect one or more of the ultraviolet light subtypes. For example, the sensor can be configured (or selected) such that its most sensitive to UVA and UVB light.

In some examples, the ultraviolet sensor periodically measures exposure to ultraviolet light and stores the reading in the memory unit. In another example, the ultraviolet sensor periodically measures exposure to ultraviolet light and calculates a cumulative tally of the ultraviolet light exposure for a specified time period. For example, a user may wear a hat with an conformal electronics device that includes a ultraviolet sensor to the beach. The conformal electronics device may make ultraviolet light reading periodically throughout the day and warn the user if the user's total daily exposure to ultraviolet light has been exceeded or the device may warn the user if current ultraviolet light levels are unacceptably high.

In another example, the conformal electronics device includes a microcapacitor. In some implementations, the microcapacitor of the device can determine the hydration of the apparel and/or of the skin of the wearer of the apparel. In some implementations, the microcapacitor can be replaced with a sensor that measures capacitance. In one example, the microcapacitor includes a plurality of serpentine fingers disposed proximate to a second plurality of serpentine fingers. The serpentine fingers of the separate pluralities of serpentine fingers are not electrically coupled to one another but are interlaced at a distance with one another such that an electrical change in the first plurality of serpentine finger can induce a charge in the second plurality of serpentine fingers. The serpentine fingers of the microcapacitor can be used to detect levels of hydration because fluids such as but not limited to, sweat, rain, and water or the hydration level on which the microcapacitor is disposed can effect the ability of the first plurality of serpentine fingers to cause a charge in the second plurality of serpentine fingers.

FIG. 1 shows an example of a conformal electronics device 100 for tagging. The flexible device 102 is disposed onto a flexible substrate 104. The flexible substrate can include any of the materials described above and can include a polymer, an elastomer, a fabric, a thermo-polyurethane, a thermo-polyester, or paper. In some implementations the flexible sensor 102 and/or the flexible substrate 104 are encapsulated in a flexible polymer. For example, the substrate can be a polymer, such as but not limited to a polyimide. The substrate can be removed outside and/or inside the coil. In an example, the substrate can be removed between the windings of the coil. The form factor can be constructed as a flex circuit that is disposed between sheets thermoplastic urethane (TPU) which are welded using any of a number of techniques, including using radio-frequency energy, heating or ultrasonically, and then die cut into a desired shape, such as but not limited to a donut shape. Total thickness can be less than or equal to about 1 mm, or greater than 1 mm. The conformal electronics device can be enclosed within an electronics pouch that is completely waterproof. Furthermore, the electronics pouch could be made to be washable and/or dryable. The electronics pouch can be welded materials or otherwise mounted to the apparel or inserted into a sewn pouch in the apparel.

According to the principles disclosed herein, any of the devices disclosed herein can make measurements of various body parts. The devices disclosed herein can be disposed over or proximate to the head, throat, arm, hands, fingers, chest, leg, and foot. The devices disclosed herein can also include sensor to detect blood pressure, electrical activity (e.g. EKG activity), blood oxygenation levels, pulse, location, position, and movement.

The example tagging device 100 also includes an integrated circuit component 106 coupled to a stretchable, conductive coil 108. The integrated circuit component 106 can also include a memory unit 110. As described above, in some implementations, the conductive coil 108 can be an antenna configured to receive and/or transmit data wirelessly. The flexile device 102 can store the data received and/or data to be transmitted on the memory unit 110. In an example, the flexible device 102 receives power through RF induction of the conductive coil 108. In some implementations, the memory unit includes EPROM, EEPROM and/or another form of programmable memory. In one example, the central core 112 of the flexible substrate 104 is hollow.

Figure 2:
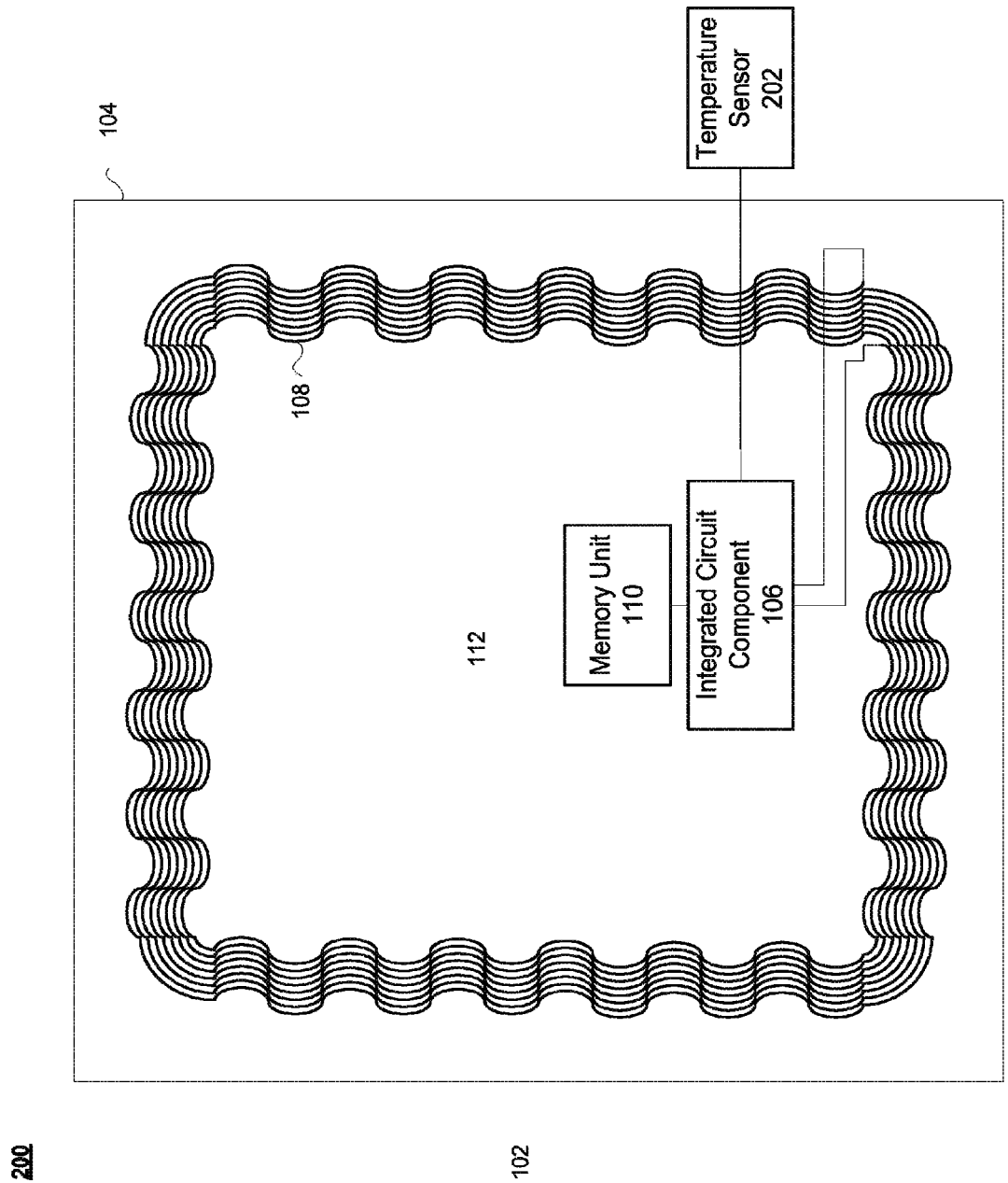
FIG. 2 shows an example conformal electronics device for measuring temperature, according to the principles herein.

FIG. 2 is an example temperature monitoring conformal electronic device 200 for integration into apparel. Similar to the example in FIG. 1, the temperature monitor of FIG. 2 includes a flexible device 102 disposed on a flexible substrate 104. The example device also includes an integrated circuit component 106 coupled to a memory unit 110 and a conductive coil 108. Additionally, the example temperature monitoring device 200 can include a temperature sensor 202. In some implementations the temperature sensor 202 is disposed on the flexible substrate 104 and in some implementations the temperature sensor 202 is a separate, but proximate to, the flexible substrate 104. For example, the temperature monitoring device 200 can be incorporated into a jacket, and the temperature monitoring device 200 can then be coupled to temperature sensors 202 disposed throughout the jacket. In an example, the example temperature monitoring conformal electronic device 200 is configured to show a user that the selected apparel is suited for the environmental temperatures and is maintaining the user's core body temperature appropriately. For example, the device 200 may monitor a wearer's temperature and be responsive to a decrease in the wearer's body temperature and issue an alert to the wearer to add additional layers of clothing.

Figure 3:
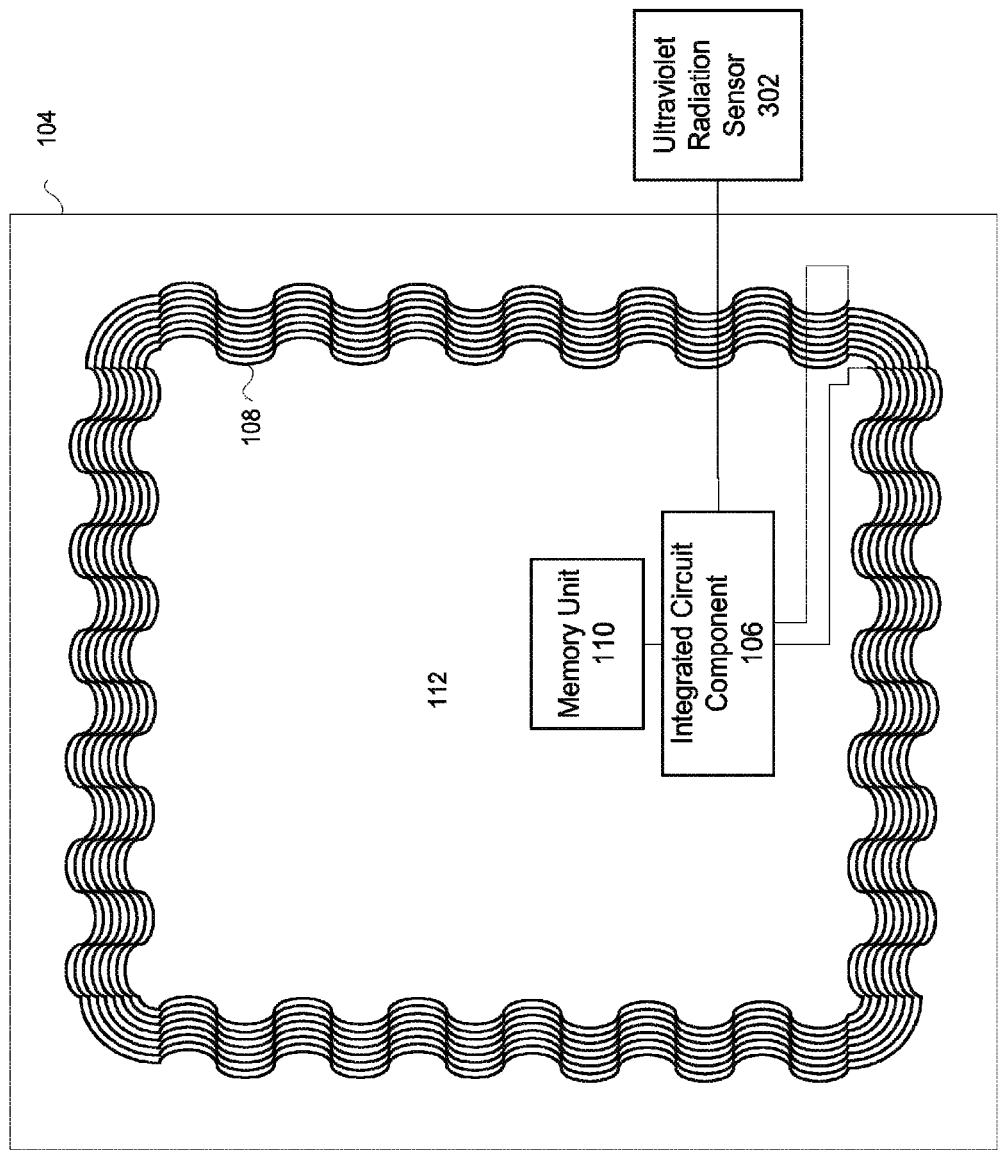
FIG. 3 shows an example conformal electronics device for measuring ultraviolet radiation, according to the principles herein.

FIG. 3 is an example ultraviolet radiation monitoring device 300 for integration into apparel. The example ultraviolet radiation monitoring device 300 includes a flexible device 102 disposed on a flexible substrate 104. A conductive coil 108 can also be disposed on the flexible substrate and can be electrically coupled to a integrated circuit component 106. The integrated circuit component 106 can be coupled to a memory unit 110. The ultraviolet radiation monitoring device 300 can also include a ultraviolet radiation sensor 302. In one example, the ultraviolet radiation sensor is tuned to detect specific wavelengths of ultraviolet radiation. In one example implementation, the ultraviolet radiation monitoring device 300 can be integrated into apparel or fabric that is often exposed to the sun, such as but not limited to, bathing suits, hats, boat coverings, and outdoor awnings. In another example, the conformal electronics device can be implemented to incorporate an electrophoretic display to display UV-Index, total ultraviolet exposure, and/or in range/out range indicator.

Figure 4:
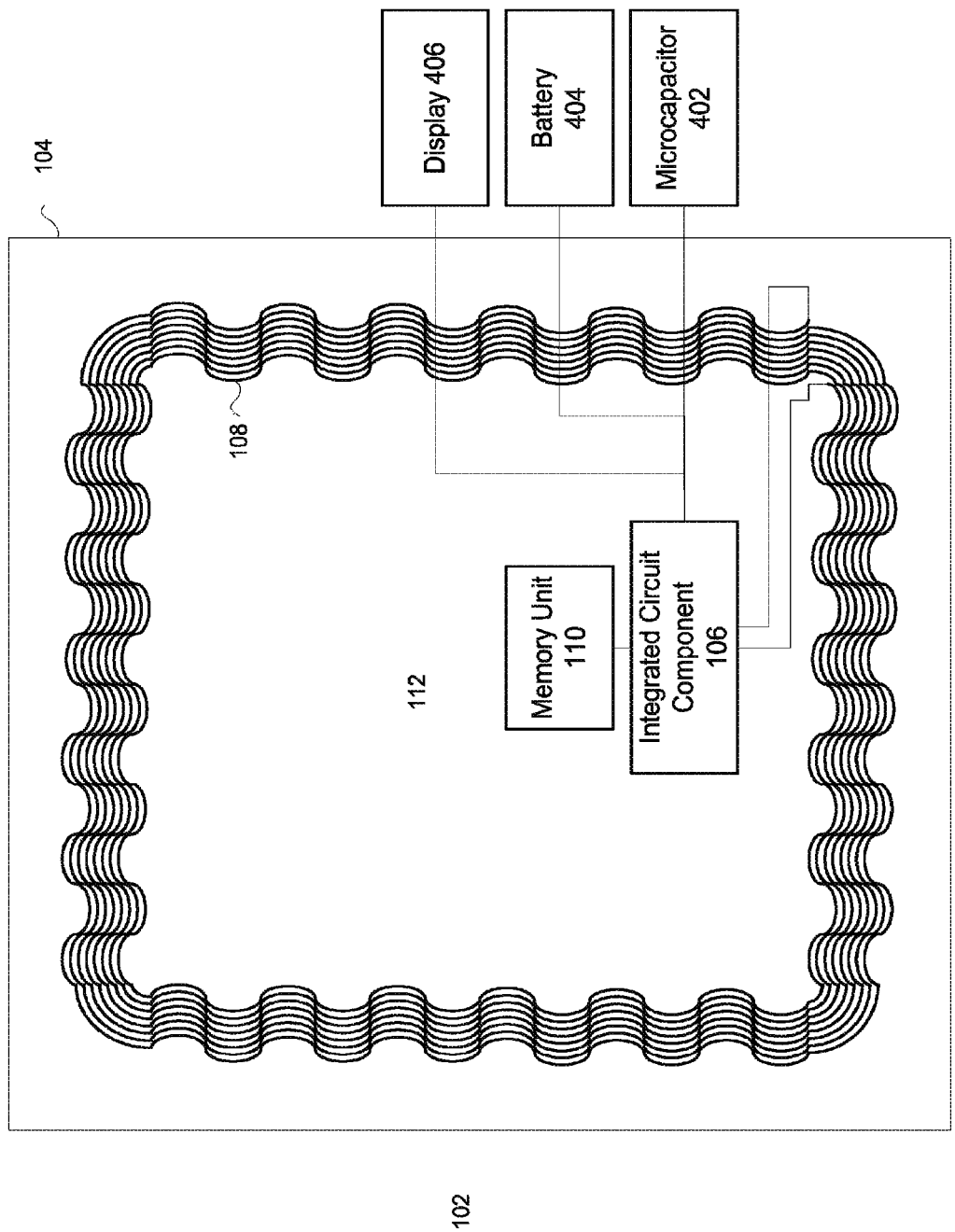
FIG. 4 shows an example conformal electronics device that includes additional components that can be added to the devices described herein, according to the principles herein.

FIG. 4 is an example conformal electronics device 400 that can be incorporated into apparel. The example conformal electronics device 400 illustrates additional components, any of which can be incorporated into any of the device disclosed herein. The example conformal electronics device 400 includes a flexible device 102 disposed on a flexible substrate 104. A conductive coil 108 can also be disposed on the flexible substrate and can be electrically coupled to a integrated circuit component 106. The integrated circuit component 106 can be coupled to a memory unit 110. The conformal electronics device 400 also includes a capacitive sensor microcapacitor 402. In one example the microcapacitor 402 is used to detect hydration levels. In another example, the microcapacitor 402 can be used to detect fluid saturation levels of apparel. For example, a microcapacitor 402 can be disposed in the socks of marathon runners. The microcapacitor can detect when the socks become overly saturated with sweat such that the runner's chance of developing blisters is heightened. In this example, the device may alert the runner to change socks or to take some other preventative action.

The example conformal electronics device 400 also includes a battery 404. In some example implementations, the battery 404 can power the conductive coil 108, creating an active transmitter/receiver to increase the wireless transmission range of the flexible device 102. The battery 404 can also be used to power the integrated circuit component 106. For example, the integrated circuit component 106 can include a processor. In some implementations, the processor can record measurements from the various sensors described herein or perform calculations on the sensor measurements.

In some examples, the example conformal electronics device 400 can include an ultrathin conformal solar cell. In some implementations, the solar cell can power the flexible device 102 directly, and in some implementations the solar cell can charge the battery 404.

The example conformal electronics device 400 can also include a display 406. In one example the display 406 is a low power display such as an electrophoretic ink display. In another example the display can be a liquid crystal display or a flat-panel display. In some examples, the display 406 can display data stored on the memory unit 110 or current sensor readings. For example, the display 406 can be incorporated into an athlete's jersey and display the athlete's jersey number. In some examples, the display can be used to identify similar garments, such as uniforms, from one another. In some examples, the display 406 can be an indicator light, such as a LED. For example, the device may be incorporated into a football jersey and includes a temperature monitor that measures the body temperature of the player wearing the jersey. In one example, if the football player's body temperature rises to an unsafe level the indicator can illuminate to indicate to a coach that the player is experiencing an unsafe physiological condition. Similarly, temperature sensors may be disposed in the tips of mountaineering gloves such that if the fingers of a user fall below a specific temperature, the wearer of the gloves is altered by an illuminated indicator light that the wearer is experiencing possible frostbite conditions. In an example, the display can be configured to display a recommendation of a clothing selection based on a sensor reading. The display can be configured to display data in a numerical format, as a graphical symbol, as a plot, or as an indicator range that indicates the results of a comparison of one or more values.

Figure 5A:
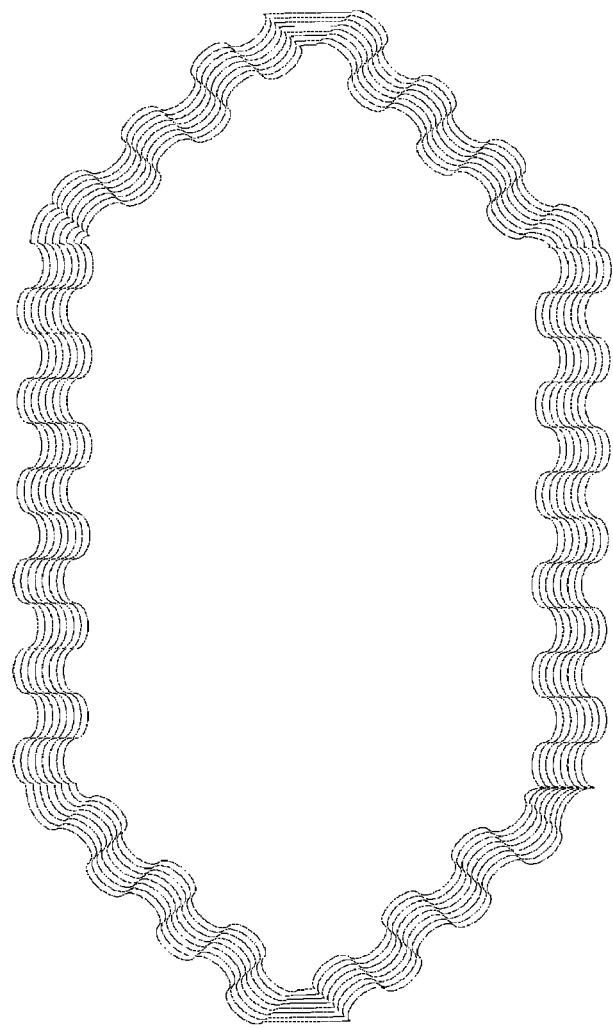
FIG. 5A shows a polygon-shaped coil example of stretchable coil shapes, according to the principles herein.
Figure 5B:
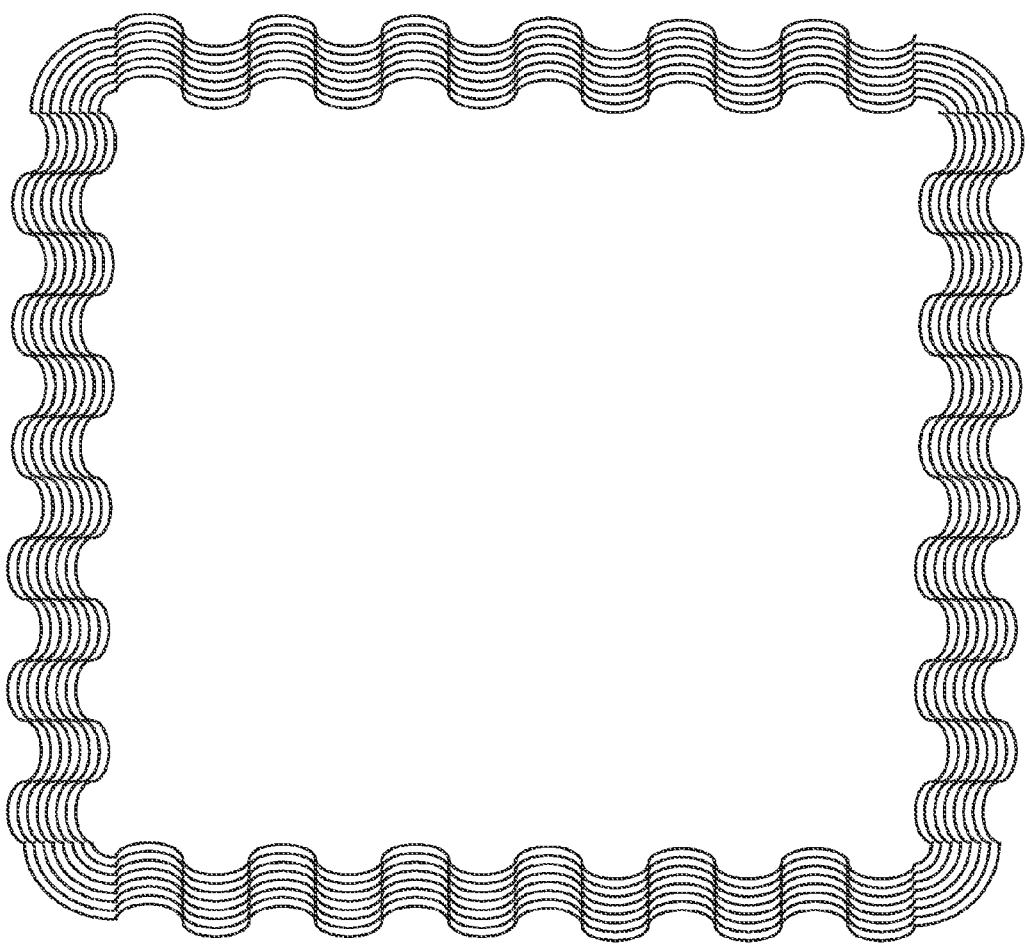
FIG. 5B shows a square-shaped coil example of stretchable coil shapes, according to the principles herein.
Figure 5C:
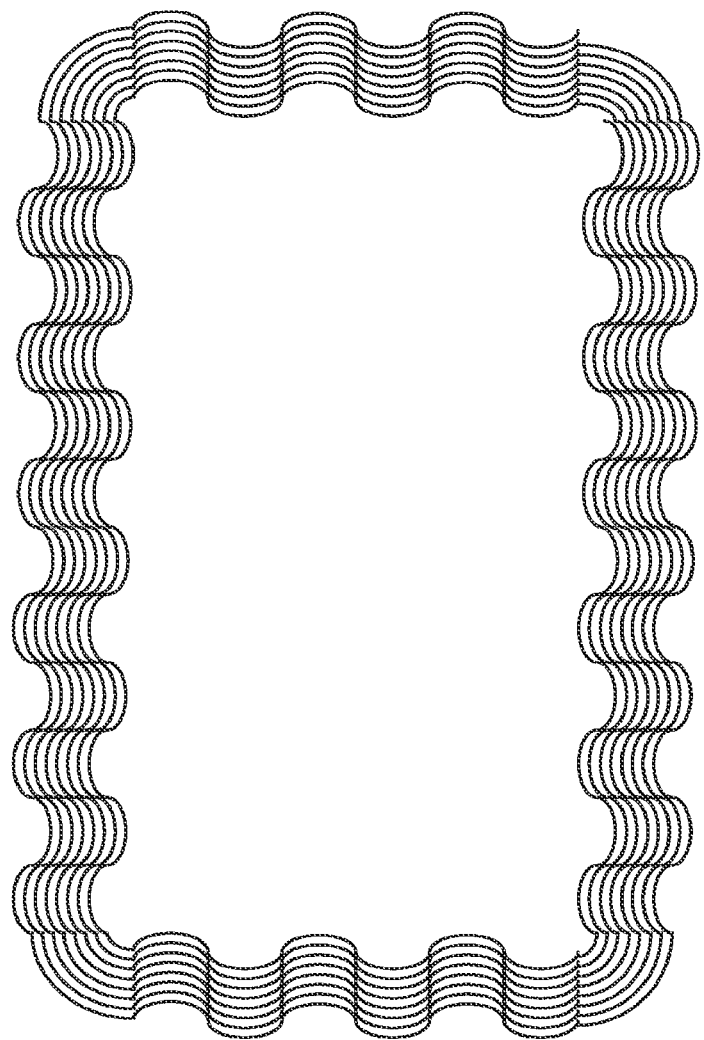
FIG. 5C shows a rectangular-shaped coil example of stretchable coil shapes, according to the principles herein.

FIGS. 5A-5C shows non-limiting examples conductive coil shape. FIG. 5A shows a polygon shaped coil, FIG. 5B a square shaped coil, and FIG. 5C a rectangular shaped coil. In the devices discloses herein the overall shape and number winds of the conductive coil can be varied to fulfill the specific requirements of an example.

Figure 6C:
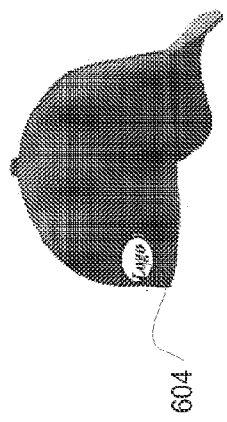
FIG. 6C shows a hat non-limiting example of clothing and apparel that can incorporate conformal electronics, according to the principles disclosed herein.
Figure 6D:
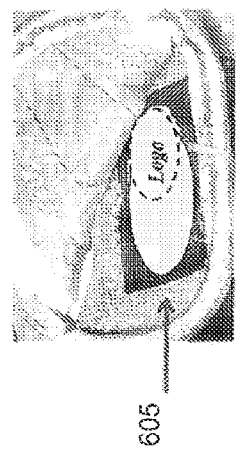
FIG. 6D shows a glove non-limiting example of clothing and apparel that can incorporate conformal electronics, according to the principles disclosed herein.
Figure 6E:
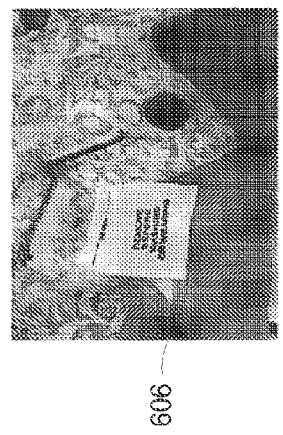
FIG. 6E shows a tag non-limiting example of clothing and apparel that can incorporate conformal electronics, according to the principles disclosed herein.
Figure 6A:
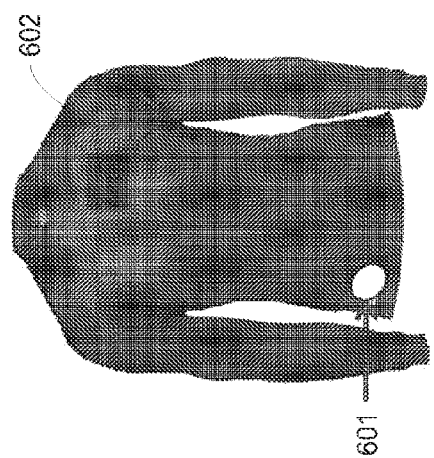
FIG. 6A shows a tactical wear non-limiting example of clothing and apparel that can incorporate conformal electronics, according to the principles disclosed herein.

FIGS. 6A-6E show non-limiting examples of clothing and apparel that can incorporate conformal electronics. As described above, the conformal electronics can be disposed in, but not limited to, outerwear, innerwear, tactical wear, sports jerseys, hats, socks, and gloves. FIG. 6A is a non-limiting example of tactical wear such that might be worn under a soldier's uniform. In some examples, the conformal electronics are disposed in tags or logos that can commonly be found on apparel. In some examples, this can obscure or hide the conformal electronics such that a wearer of apparel may not be able to feel the conformal electronics when wearing the appeal. The logo 601 at the bottom of the tactical shirt can be used for heavier or bulkier conformal electronics in some examples. These types of conformal electronics may be located in a location that incurs low ranges of motion. The placement of logo 602 provides an additional example location for conformal electronics. In an example, the logo 602, because of its location relative to the heart, may include conformal electronics configured to detect EKG and/or other physiological parameters.

Figure 6B:
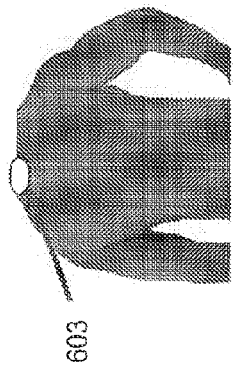
FIG. 6B shows an undershirt non-limiting example of clothing and apparel that can incorporate conformal electronics, according to the principles disclosed herein.

FIG. 6B shows a non-limiting example of an undershirt in which conformal electronics are disposed. In this example, tag 603 can contain conformal electronics. In this example, the tag 603 may include laundry instructions or personal contact information. In an example, the information stored on the tag 603 can aid in the sorting or identification of apparel. As described above, a dry cleaner may use the information within the tag to properly dry clean a shirt according to a customer's preferences. In another example, the tag 603 can be used to identify similar articles of clothing such as uniforms.

FIG. 6C shows a non-limiting example of a hat that includes conformal electronics within a logo 604 on the back of the hat. In a similar example, conformal electronics can be disposed within the inner lining of the hat or disposed in the button found on the top of most hats. In an example, the logo 604 or other conformal electronics disposed in a hat can include a temperature sensor. In some implementations, the temperature sensor of conformal electronics disposed within a hat may warn a wearer of the hat if it detects the wearer's temperature is within dangerous levels. In another example, the logo 604 can include an ultraviolet sensor to detect if a wearer of the hat has been exposed to too much ultraviolet radiation for a given time period. In certain examples, the logo 604 can contain a hydration sensor to monitor the amount of water a user has lost. In other implementations, the conformal electronics of the hat can include a plurality of sensor such that a processor within the hat can analyze the data to determine if a wearer of the hat is in danger of experiencing a heat stroke. In another example, the conformal electronics may suggest to a wearer of the hat how often and/or how much water to consume response to the current environmental conditions and the wear's current physiological conditions.

FIG. 6D shows a non-limiting example of a glove that includes conformal electronics. In the example of FIG. 6D conformal electronics are disposed in a logo 605 within the interior of a glove. In another example, conformal electronics can be disposed in the finger tips and/or palms of the gloves. In one example, the conformal electronics disposed within the glove can include temperature sensors. In some examples, the conformal electronics and temperature sensor can be configured to warn a wearer if temperatures within the glove cross a predetermined threshold. In one example, the conformal electronics within the glove can warn a wearer if the wearer's fingers are too cold such that the wearer may experience frostbite. In another example, the conformal electronics can be disposed within gloves designed to protect a wearer from excessive heat, such as an oven mitt. In this example, the conformal electronics may warn the user if the user is attempting to grab an item with a temperature that exceeds a safety rating for the glove.

FIG. 6E shows a non-limiting example of a conformal electronics tag 606 disposed within a pouch. In any of the examples described herein, the conformal electronics can be disposed in pouch or other area of the garment specifically designed to receive the conformal electronics. In some examples, the conformal electronics disposed within a pouch may be used for identification of apparel. For example, a store may include the conformal electronics within the garments they sell. The conformal electronics tags can contain information such as but not limited to the garments and size. In some implementations, the tag may be coupled to a garment such that it can be removed by a user after purchasing the garment.

Figure 7:
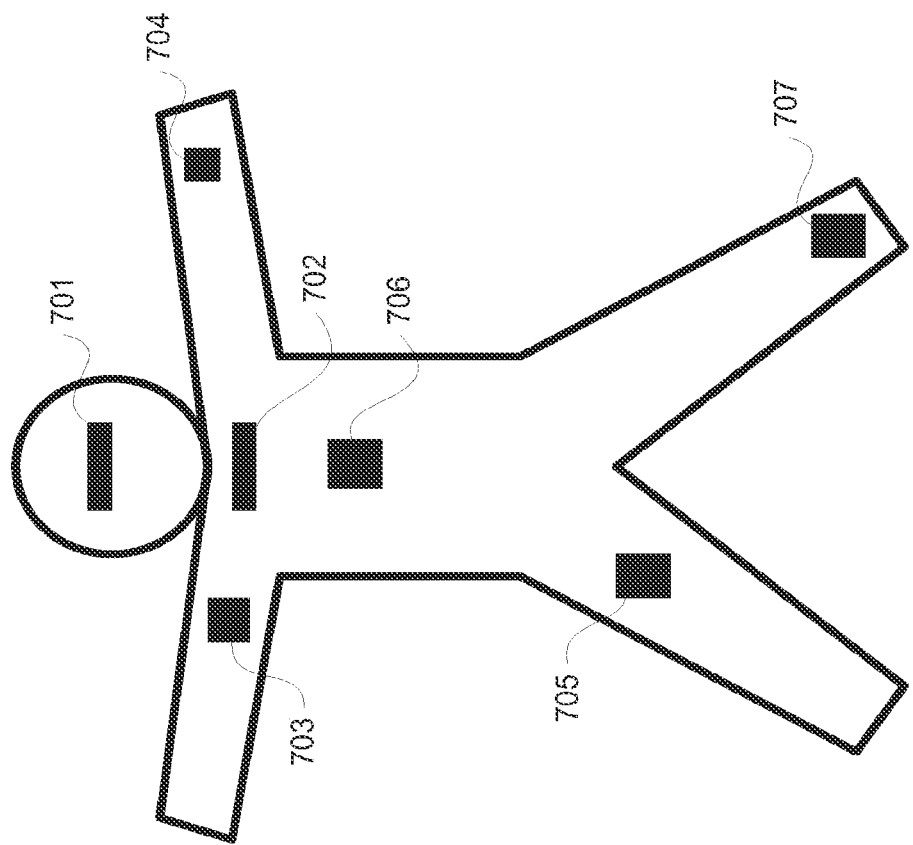
FIG. 7 shows a plurality of non-limiting examples of locations where conformal electronics devices can be disposed proximate to on a human subject show a plurality of non-limiting examples of places, according to the principles disclosed herein.

FIG. 7 shows a plurality of non-limiting examples of locations where conformal electronics devices can be disposed proximate to on a human subject. For example, conformal electronics 701 disposed near the wearer's head can be used to detect temperature and/or electrical activity of the brain. A conformal electronics device 702 disposed near a wearer's throat can detect respiration. A conformal electronics device 703 disposed near a wearer's arm can detect pulse rate, blood pressure, ultraviolet radiation, and under arm temperature. A conformal electronics device 704 disposed near a wearer's hand can detect blood oxygenation, pulse, and blood pressure. A conformal electronics device 705 disposed near a wearer's leg can detect hydration levels, and can detect muscle activity by measuring the electrical signals generated by the muscles when they contract. A conformal electronics device 706 disposed near a wearer's chest can measure a wearer's heart rate, respiration rate, electrocardiograms, body temperature, and posture. A conformal electronics device 707 disposed near a wearer's foot can detect a wear's weight.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be examples and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that inventive embodiments may be practiced otherwise than as specifically described. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments of the invention may be implemented in any of numerous ways. For example, some embodiments may be implemented using hardware, software or a combination thereof. When any aspect of an embodiment is implemented at least in part in software, the software code may be executed on any suitable processor or collection of processors, whether provided in a single device or computer or distributed among multiple devices/computers.

Also, the technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification, unless clearly indicated to the contrary, should be understood to mean "at least one."

The phrase "and/or," as used herein in the specification, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

What is claimed:

1. An apparatus comprising:
a flexible substrate;
a flexible device disposed on the flexible substrate, the flexible device comprising:
a flexible coil formed from a conductive material disposed on the flexible substrate; and
an integrated circuit component disposed proximate to and in electrical communication with the flexible coil, the integrated circuit component comprising at least one memory that is read and write-enabled;
a flexible encapsulant encapsulating the flexible device;
an energy supply in electrical communication with the integrated circuit component; and
a microcapacitor in electrical communication with the energy supply and the integrated circuit component;
wherein the apparatus is configured for remote data read- and write-operations to the at least one memory to store identifying information.

2. The apparatus of claim 1, wherein the integrated circuit component comprises at least one of an erasable programmable read only memory (EPROM) and an electrically erasable programmable read only memory (EEPROM).

3. The apparatus of claim 1, wherein the flexible substrate and flexible encapsulant are configured such that the apparatus remains functional after exposure to water.

4. The apparatus of claim 1, wherein the apparatus is configured for remote data read and write operations to the at least one memory.

5. The apparatus of claim 4, wherein the apparatus is configured to perform read or write operations to the at least one memory based on a radio-frequency signal detected by the flexible coil or based on a radio-frequency signal transmitted using the flexible coil.

6. The apparatus of claim 1, wherein the at least one coil structure is polygonal-shaped, circular-shaped, square-shaped, or rectangular-shaped.

7. The apparatus of claim 1, wherein the flexible substrate comprises at least one of a polymer, an elastomer, a fabric, a thermo-polyurethane, a thermo-polyester, or paper.

8. The apparatus of claim 1, wherein the flexible coil comprises a hollow central region, and wherein the flexible substrate and flexible encapsulant are configured such that the apparatus comprises a hollow core that coincides with the hollow central region of the flexible coil.

9. The apparatus of claim 1, wherein the identifying information comprises at least one of a user name, a unique identifier, a user identification, a player designation, a jersey number, a military identification, laundry instructions, a location.

10. An apparatus for monitoring a temperature, the apparatus comprising:
a flexible substrate;
a flexible device disposed on the flexible substrate, the flexible device comprising:
a flexible coil formed from a conductive material disposed on the flexible substrate; and
an integrated circuit component disposed proximate to and in electrical communication with the flexible coil, the integrated circuit component comprising at least one memory that is read and write-enabled;
a flexible encapsulant encapsulating the flexible device;
a temperature sensor in communication with the flexible device, to perform at least one temperature measurement;
an energy supply in electrical communication with the integrated circuit component; and
a microcapacitor in electrical communication with the energy supply and the integrated circuit component;
wherein data indicative of the at least one temperature measurement is stored to the at least one memory.

11. The apparatus of claim 10, wherein the energy supply is a battery or a solar cell.

12. The apparatus of claim 10, wherein the flexible device is configured to perform the at least one temperature measurement at regular time intervals, and wherein the data indicative of the at least one temperature measurement is stored to the at least one memory at the regular time intervals.

13. The apparatus of claim 10, wherein the integrated circuit component comprises at least one of an erasable programmable read only memory (EPROM) and an electrically erasable programmable read only memory (EEPROM).

14. The apparatus of claim 10, wherein the flexible substrate and flexible encapsulant are configured such that the apparatus remains functional after exposure to water.

15. The apparatus of claim 10, wherein the apparatus is configured for remote data read and write operations to the at least one memory.

16. The apparatus of claim 15, wherein the apparatus is configured to perform read or write operations to the at least one memory based on a radio-frequency signal detected by the flexible coil or based on a radio-frequency signal transmitted using the flexible coil.

17. The apparatus of claim 10, wherein the at least one coil structure is polygonal-shaped, circular-shaped, square-shaped, or rectangular-shaped.

18. The apparatus of claim 10, wherein the flexible substrate comprises at least one of a polymer, an elastomer, a fabric, a thermo-polyurethane, a thermo-polyester, or paper.

19. The apparatus of claim 10, wherein the flexible coil comprises a hollow central region, and wherein the flexible substrate and flexible encapsulant are configured such that the apparatus comprises a hollow core that coincides with the hollow central region of the flexible coil.

20. The apparatus of claim 10, wherein the temperature sensor is disposed on the flexible substrate, and wherein the flexible encapsulant encapsulates the temperature sensor.

21. The apparatus of claim 10, wherein the temperature sensor is external to the flexible device, and wherein the temperature sensor is configured to transmit data indicative of the at least one temperature measurement to the flexible device using a wireless transmission protocol.

22. The apparatus of claim 10, wherein the temperature sensor is external to the flexible device, and wherein the temperature sensor is coupled to the flexible device by at least one flexible interconnect.

23. The apparatus of claim 10, further comprising a display coupled to the flexible device to display information based on the at least one temperature measurement.

24. The apparatus of claim 23, wherein the display displays at least one of a numerical value indicating the at least one temperature measurement, a graphic symbol representing the at least one temperature measurement, a graphic plot based on the at least one temperature measurement, or a range indicator that indicates the result of a comparison of the at least one temperature measurement to a predetermined threshold value.

25. The apparatus of claim 23, wherein the display displays a recommendation of clothing selection based on the at least one temperature measurement.

26. The apparatus of claim 23, wherein the display comprises an electrophoretic ink display, a liquid crystal display, or a flat-panel display.

* * * * *